United States Patent [19]
Epworth

[11] Patent Number: 5,452,117
[45] Date of Patent: Sep. 19, 1995

[54] DIRECT DETECTION OF FSK

[75] Inventor: Richard E. Epworth, Sawbridgeworth, United Kingdom

[73] Assignee: Northern Telecom Limited, Montreal, Canada

[21] Appl. No.: 242,731

[22] Filed: May 13, 1994

Related U.S. Application Data

[63] Continuation-in-part of Ser. No. 898,071, Jun. 12, 1992, abandoned.

[51] Int. Cl.⁶ .............................................. H04B 10/04
[52] U.S. Cl. ..................................... 359/187; 359/181; 359/182; 372/38
[58] Field of Search ........ 359/187, 184, 183, 181–182, 359/161; 372/31, 33, 38

[56] References Cited

U.S. PATENT DOCUMENTS

| | | | |
|---|---|---|---|
| 4,805,235 | 2/1989 | Henmi | 359/182 |
| 5,025,487 | 6/1991 | Eichen | 359/182 |

FOREIGN PATENT DOCUMENTS

| | | | |
|---|---|---|---|
| 0505048 | 9/1992 | European Pat. Off. | 359/182 |
| 0041043 | 2/1990 | Japan | 359/182 |

OTHER PUBLICATIONS

King et al. "FSK/IM Scheme For Unrepeatered Optical Systems", IEE Colloquium on 'Sources for Very High Bit Rate Optical Communication Systems' (Digest No. 080, pp. 8/1–5) ∝ 8 Apr. 1992.

*Primary Examiner*—David K. Moore
*Assistant Examiner*—Kinfe-Michael Negash
*Attorney, Agent, or Firm*—Lee, Mann, Smith, McWilliams, Sweeney & Ohlson

[57] ABSTRACT

A method of controlling a laser in an FSK direct detection system employing a two-path unbalanced interferometer in series with the laser output, the method including the steps of sensing when the system output level reaches a predetermined threshold, and superimposing a fixed amplitude step of drive current on the feedback controlled modulated drive current to the laser. The superimposed fixed amplitude step in the laser drive current causes a phase shift in the interferometer sufficient to cause the interferometer to acquire a fresh interference fringe whenever the interferometer is near to running out of range. The superimposed fixed amplitude step may be synchronized with a data bit transition.

6 Claims, 5 Drawing Sheets

– 5,452,117 –

DIRECT DETECTION OF FSK

RELATED APPLICATION

This application is a continuation-in-part of U.S. patent application Ser. No. 07/898,071, filed Jun. 12, 1992, now abandoned.

BACKGROUND OF THE INVENTION

This invention relates to direct detection of frequency shift keyed (FSK) signals in an optical high bit rate transmission system.

FIELD OF THE INVENTION

In an optical FSK direct detection system a phase shift in the optical frequency may be converted to binary data by means of an unbalanced two-path interferometer. The operating point of the laser is usually stabilised by a feedback loop to ensure that the binary "0"s and "1"s correspond to the interferometer fringe maxima and minima respectively. This feedback loop can track the fringes as they drift slowly due to, e.g. temperature changes. However, a problem arises in that the feedback loop can run out of tracking range with changes in mean laser frequency and differential length of the interferometer. FIG. 1 shows the effect of drifting downward of the operating point in a system until the lower limit of the operating range is reached. A set of fringes F is shown on the left of FIG. 1 with the laser modulation operating on the fringe marked F1, which is effective above the lower end of the operating range of the laser. The laser drive current is modulated in accordance with the data sequence of "0"s and "1"s. As time goes by FIG. 1 depicts the general downward movement (towards the right) of the set of fringes F (as indicated by the diagonal lines) until the laser runs out of its effective operating range. That is, a situation is reached where the laser drive current for binary "0" drops below the lower limit at time $t_1$. A this time the feedback loops can no longer track fringe F1 and a large number of errors will occur until the interferometer acquires a new fringe F2 at time $t_2$, at which time the feedback loop can regain control. At this time the interferometer will slip by $2\pi$ to acquire the next fringe. However, as acquisition and locking is a feedback process with low bandwidth it takes time and many bits of data are corrupted during this period $t_1-t_2$, thus producing large bursts of errors.

If the system continues to drift then the time will come, at time $t_3$, when fringe F2 sinks to the point where once again, the laser drive current falls below the lower limit of the laser operating range and once again massive errors will occur until the next fringe F3 is acquired.

The lower limit in practice is the point at which the laser drive current falls so low that the output power is too small or the coherence of the output is too low.

SUMMARY OF THE INVENTION

According to the present invention there is provided a method of operating an optical transmitter laser in an FSK data direct detection system wherein the laser is supplied with a drive current modulated in accordance with the logic values of a digital data sequence, the transmitter having a feedback control circuit arranged to adjust the laser drive current in response to changes in operating parameters of the transmitter, the method including the stages of: sensing when the range of available feedback adjustment is about to be exceeded represented by a selected system parameter reaching a preset threshold, and superimposing on the feedback controlled laser drive current an additional step of predetermined fixed amplitude of drive current to the laser to bring the operation of the transmitter back within the range of adjustment of the feedback control circuit.

Preferably the method includes synchronisation of the application of the additional fixed amplitude step of drive current with a clock transition of the modulation signal applied to the laser.

BRIEF DESCRIPTION OF THE DRAWINGS

Embodiments of the invention will now be described with reference to the accompanying drawings, in which.

DESCRIPTION OF PREFERRED EMBODIMENTS

Figure 1:
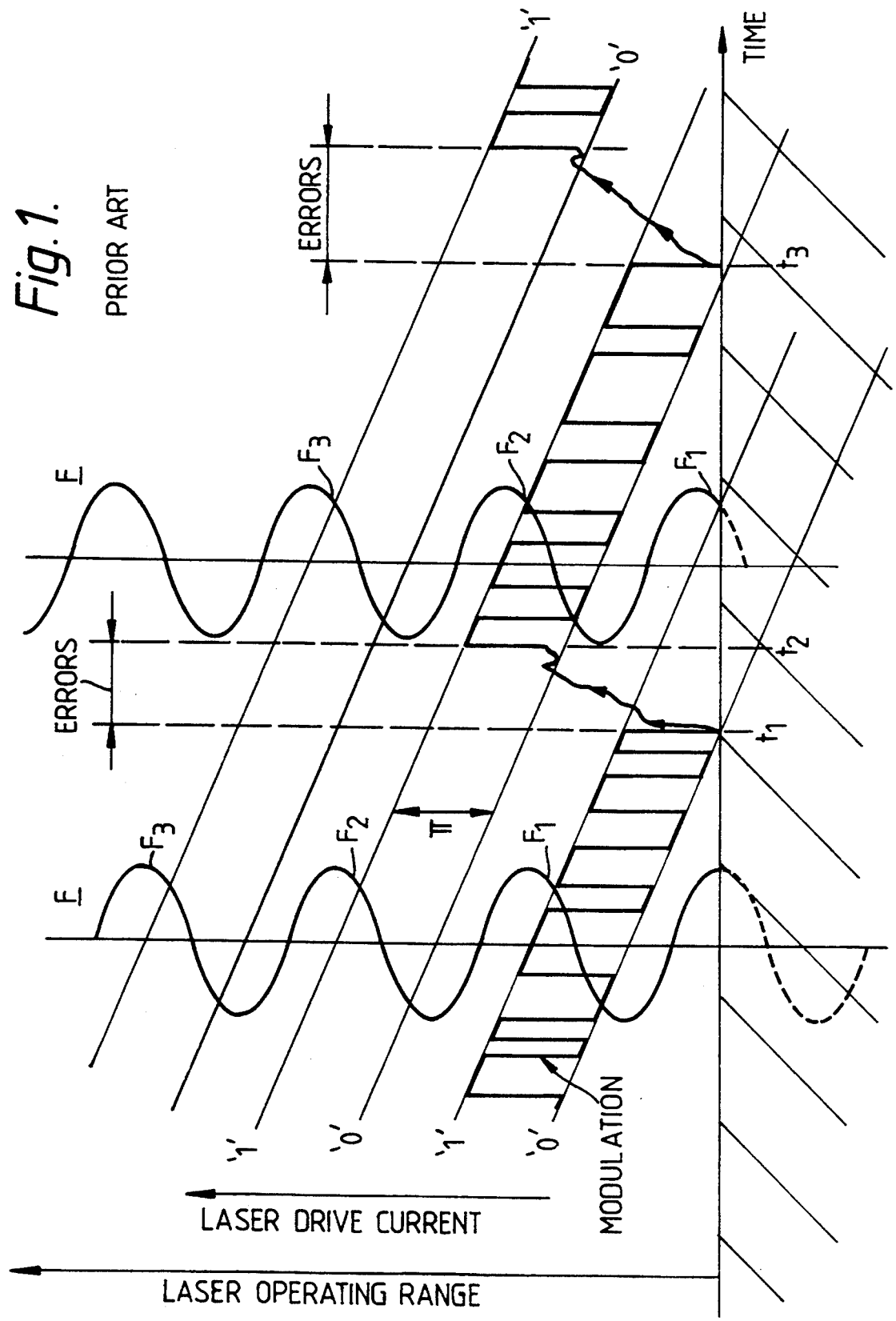
FIG. 1 shows the effect of downward drift of the operating point of an FSK direct detection system (already described)
Figure 2:
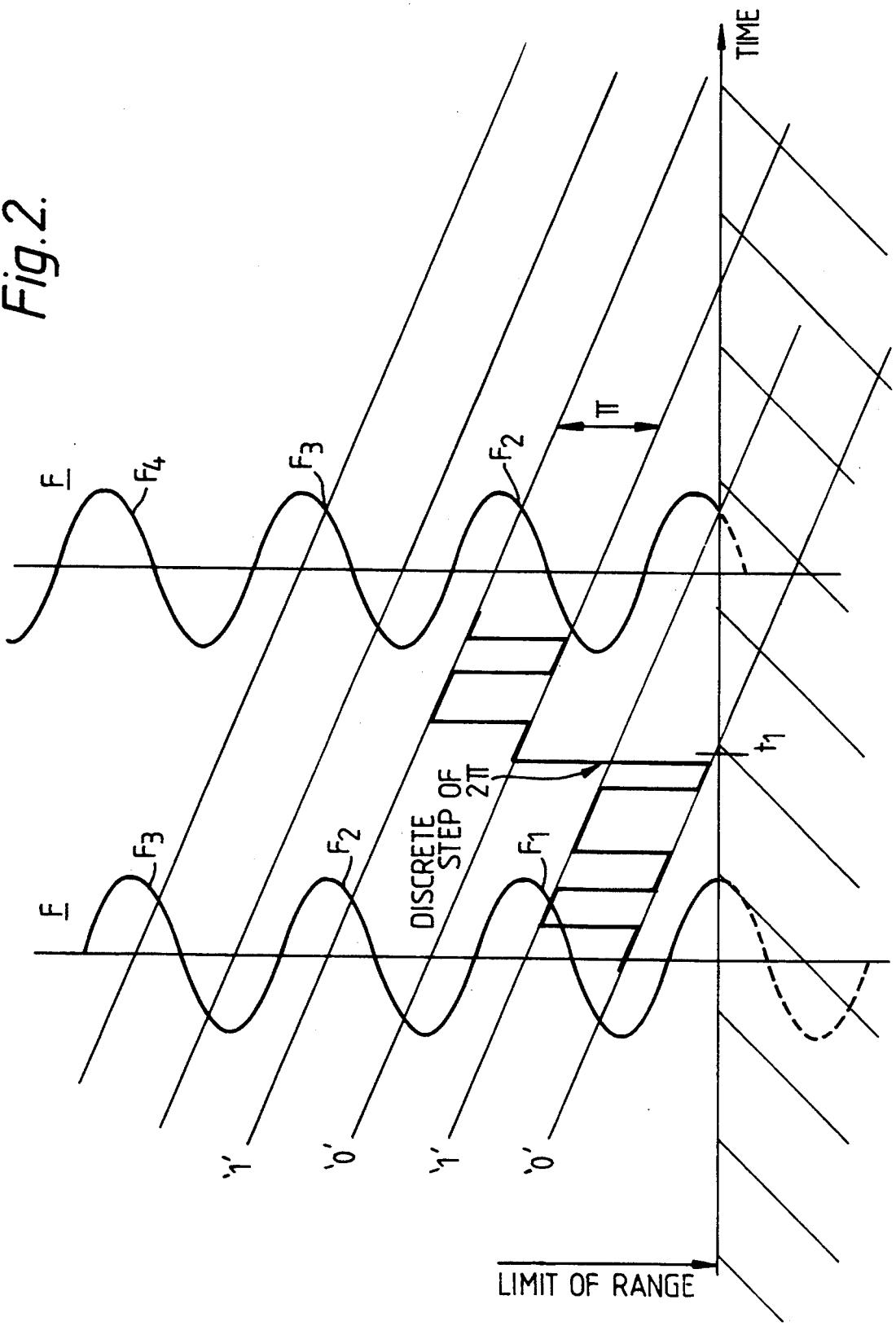
FIG. 2 shows the effect of superimposing a feedforward fixed amplitude step of drive current to the laser to achieve a phase shift of $2\pi$ in the interferometer.

In FIG. 2 it is shown how a fixed amplitude feedforward step of laser drive current is applied to the laser when the laser is approaching the lower limit of its operating range. The value of the applied feedforward step is arranged so that a $2\pi$ phase shift occurs in the interferometer shortly before time $5_1$, i.e. shortly before the laser output drops below the lower limit of its operating range. This $2\pi$ phase shift is timed to occur synchronously with a clock transition in the modulating signal and results in the system moving to substantially the same position on the next interferometer fringe. This is a "dead reckoning" step or jump to a new operating point and produces an almost identical output at the instant of the step. This is in contrast to the situation where no step is applied and tracking is lost, as shown in FIG. 1, so that the next fringe is acquired solely by means of the feedback loop, which takes a comparatively long time to stabilise. To implement this $2\pi$ step of drive current the interferometer associated with the laser must be of the 'two-path' type, e.g. Mach-Zehnder, so that a relationship between output and phase is periodic.

An alternative arrangement is to apply the feedforward step of drive current at any time, rather than synchronously with the modulating signal clock, but ensuring that the feedforward step is effected rapidly. As this will occur only infrequently the resultant error rate will be low and may be acceptable. If the feedforward step can be accomplished in less than one bit period, only isolated errors will be caused by each fringe re-acquisition.

Figure 3:
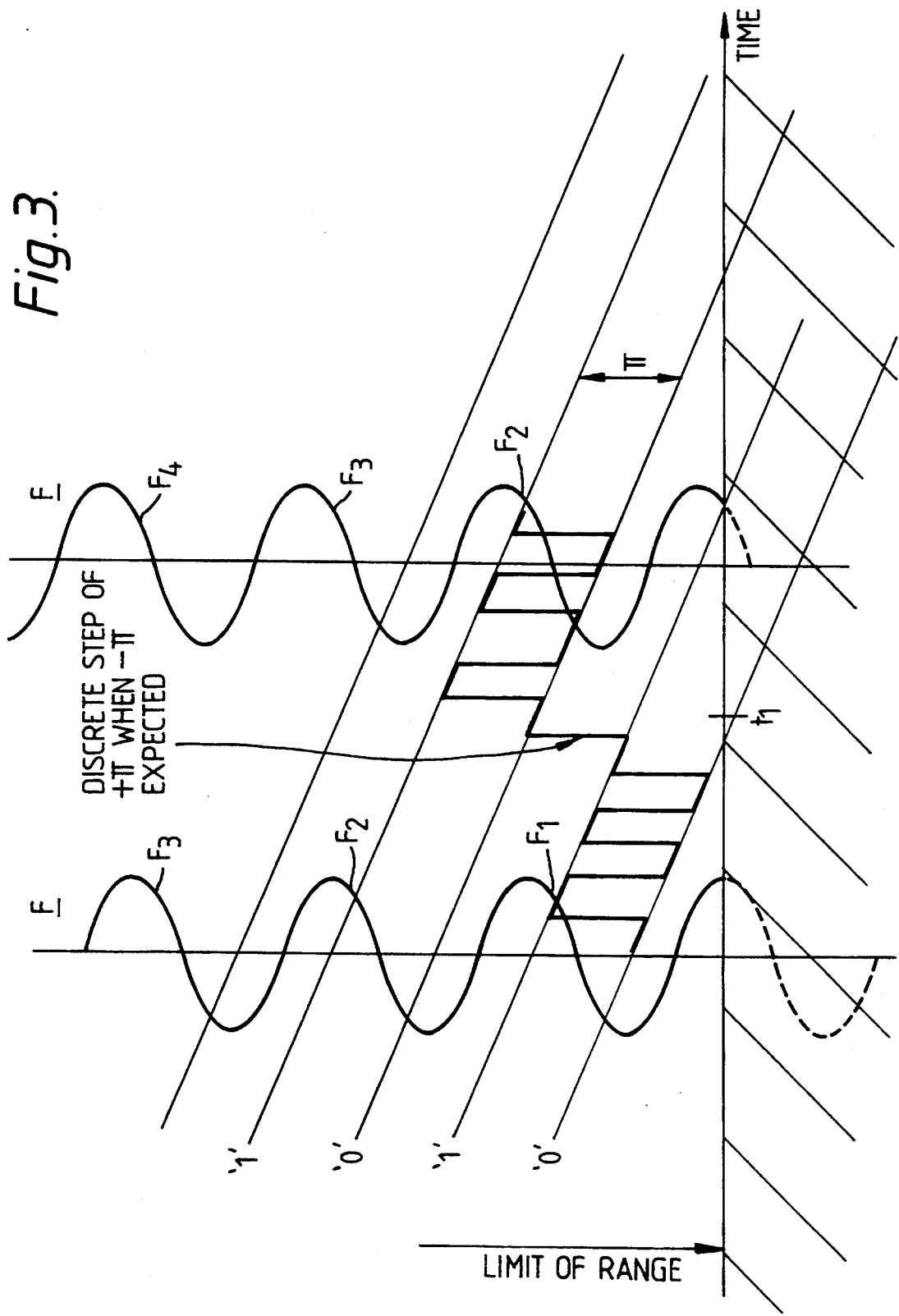
FIG. 3 shows the effect of superimposing a feedforward fixed amplitude step of drive current to the laser to achieve a phase shift of $+\pi$ in the interferometer synchronised with a $-\pi$ data transition in the modulating signal.

In FIG. 3 it is shown how the application of a feedforward step of amplitude sufficient to cause only a $\pi$ phase shift in the interferometer can be affected. In this case not only is the feedforward step effected synchronously with a clock transition but the phase shift of $+\pi$ is effected only when a data phase shift of $-\pi$ is expected, i.e. when the modulating signal is changing from binary "1" to binary "1". This is equivalent to introducing a $2\pi$ phase shift synchronously with a clock transition when there is no change in the data binary value.

Figure 4:
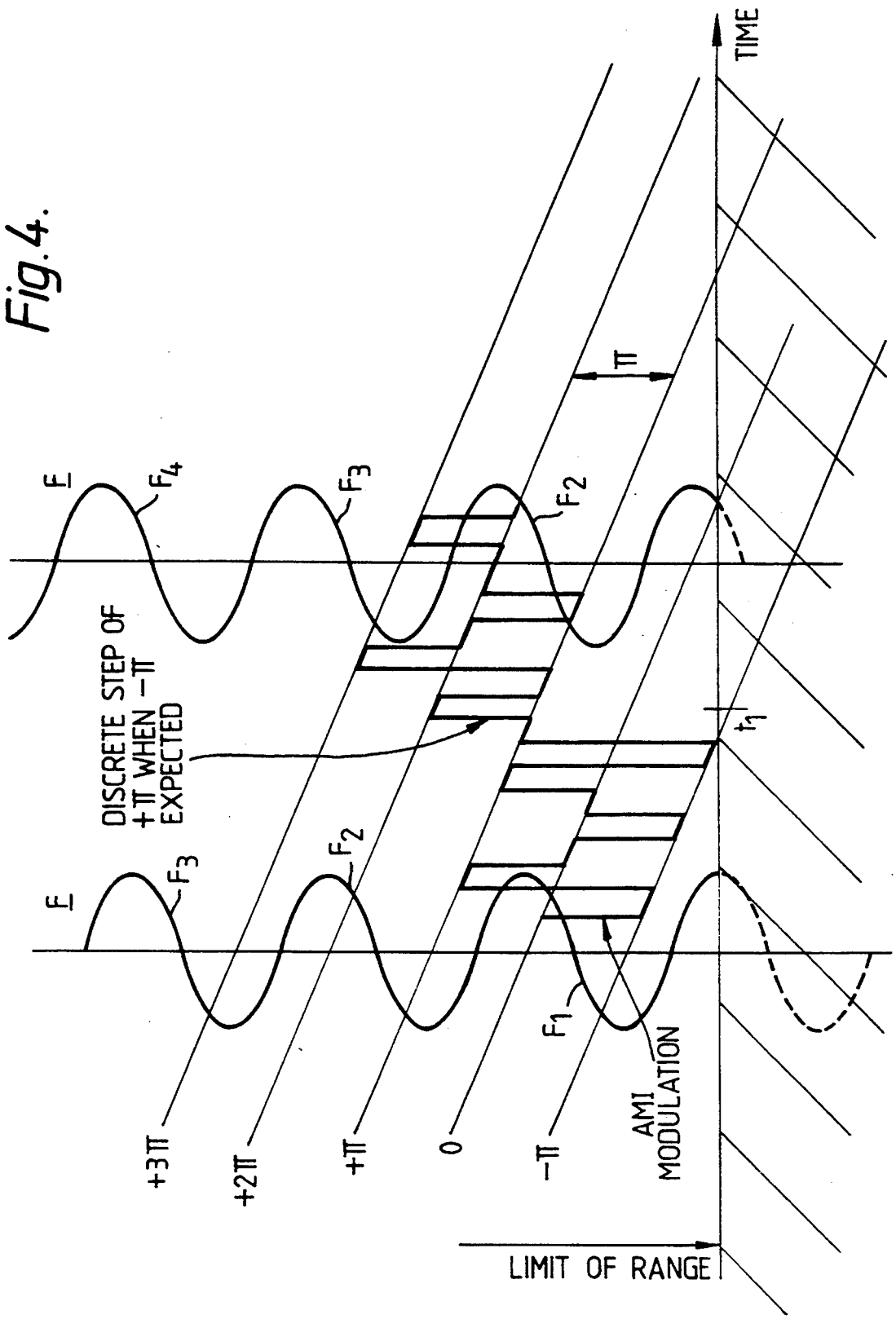
FIG. 4 shows the effect of superimposing a feedforward fixed amplitude step of drive current to the laser synchronised with a $-\pi$ data transition in the modulating signal when utilizing alternate mark inversion (AMI) modulation of the laser.

FIG. 4 shows how a phase shift of the interferometer can be effected by a feedforward step in the laser drive current when the modulating signal is in the form of alternate mark inversion (AMI) encoded binary data. However, because an AMI signal can have a swing of $\pm\pi$ about the means or "0" level, thereby causing the interferometer to operate over two adjacent fringes, the value of the feedforward step required will depend on whether the expected phase change at the time of the feedforward step is $\pi$ or $2\pi$. This in turn will be dependent on whether the data of the clock transition is changing from "0" to "1" (in either direction) or from "+1" to "−1" and vice versa. AMI coding is used in many optical FSK modulation schemes as it has negligible LF content and this avoids the problem of the "dip" in the FM low frequency response of many semiconductor lasers. AMI FSK direct detection already uses the fact that the output of a two-path interferometer is ambiguous over $\pi$ phase change. Typically the "0" level is the bottom of a fringe, and (alternate) "1"s are $+\pi$ and $-\pi$ respectively.

Figure 5:
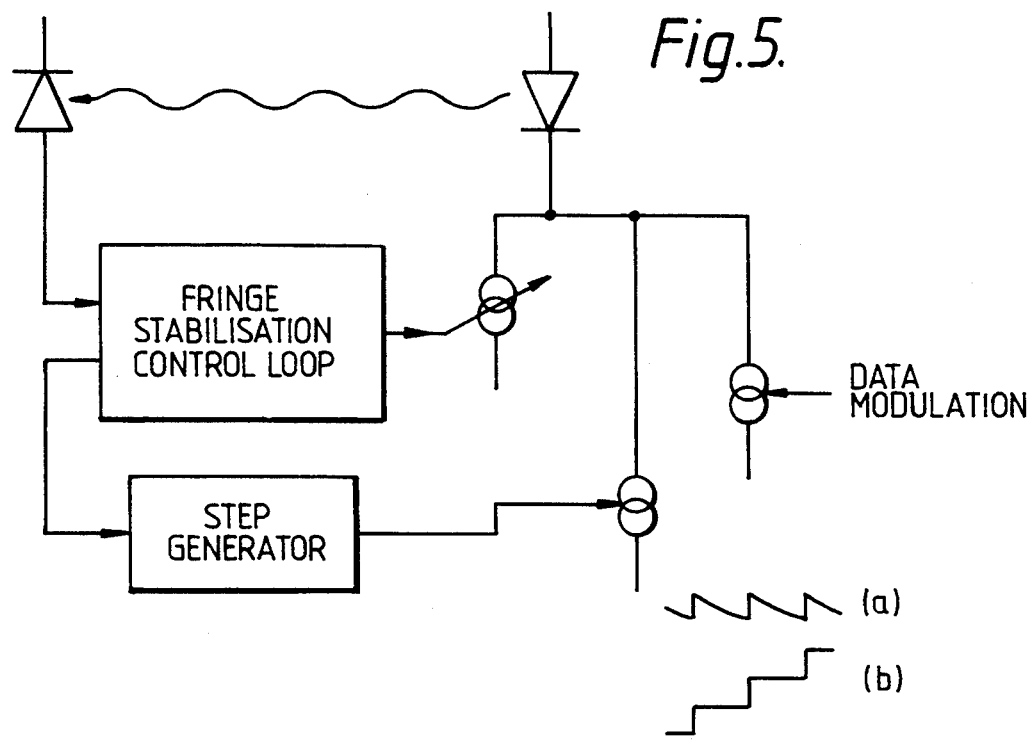
FIG. 5 illustrates one implementation of an arrangement for superimposing a feedforward fixed amplitude step of drive current on the feedback controlled modulated drive current of a laser in an FSK direct detection system.

In the implementation shown in FIG. 5 the laser 50 is driven in its operating range by a current source 51 modulated by the data. Part of the laser output is applied to a two-path unbalanced interferometer 58 the output of which is detected by sensing means in the form of a photodiode 52. The output of the photodiode 52 is fed to a conventional fringe stabilisation feedback control loop 53. In a typical fringe stabilisation loop the operating point is usually stabilised to ensure that "0"s and "1"s correspond closely to the fringe minima and maxima respectively. This may be achieved with a simple feedback loop that stabilises the dc operating point but uses a preset modulation current. A more sophisticated control loop would simultaneously control the modulation current amplitude, ensuring that "0"s and "1"s correspond precisely to the fringe minima and maxima respectively. These feedback loops operate slowly in comparison with the data bit rate. The feedback control loop controls a secondary bias current source 54 to ensure that that binary "0"s and "1"s track the current interferometer fringe. When the control loop error signal indicates that the value of the bias current applied from source 54 is approaching a level at which the loop will run out of tracking range, i.e., at or shortly before time $t_1$, a step generator circuit 55 is energised to superimpose an additional step of drive current from current source 56 to effect the required phase shift in the interferometer. In practice this phase shift is effected by a change in the laser frequency due to the change in drive current.

Figure 6:
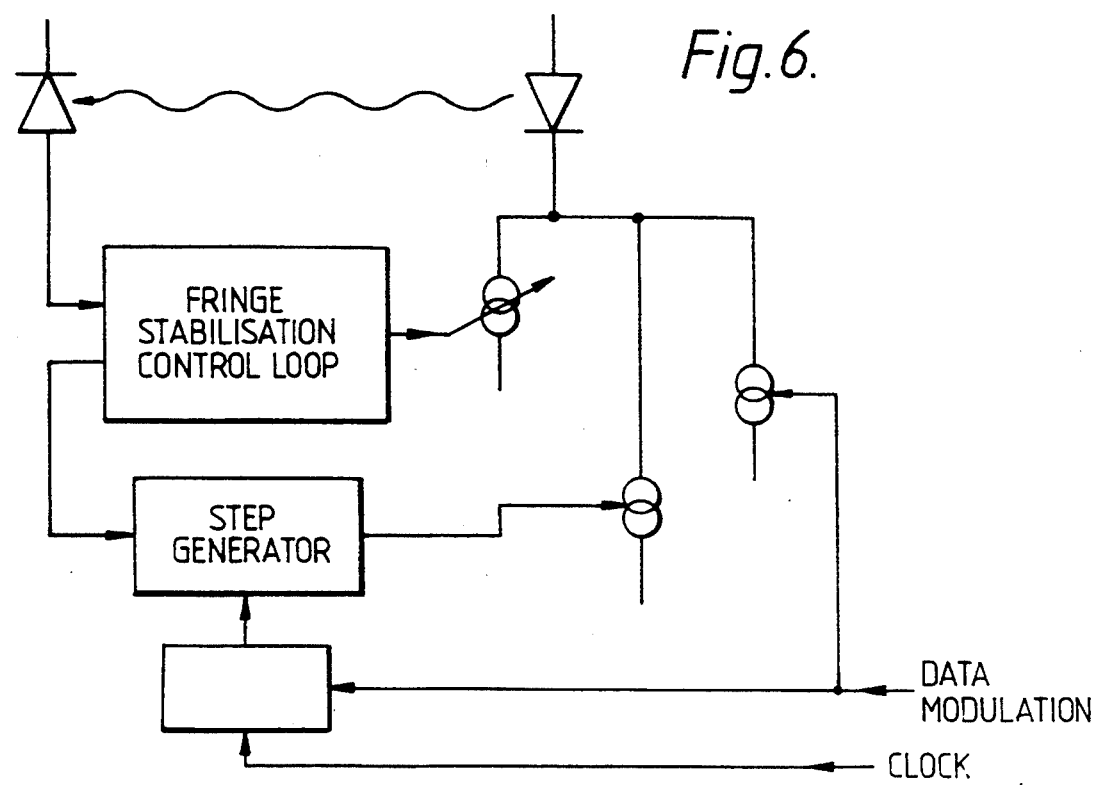
FIG. 6 illustrates an alternative implementation to that of FIG. 5.

For the case where the step in phase shift is required to be synchronised with a clock transition in the modulating data a timing circuit 57 is used to control the step generating circuit as shown in FIG. 6. The timing circuit 57 receives the data clock and the data of the amplitude of the phase shift is dependent on the direction of phase shift of the data. Thus, in the case of the arrangement shown in FIG. 4, for example, when a $2\pi$ step is required as the control loop is reaching the limit of its effective range, the timing circuit will await the arrival of a data transition when a $-\pi$ phase shift will occur and then, synchronously with the clock transition, cause the step generator to add the step in drive current to cause the required $+\pi$ phase shift, i.e. in the opposite direction. This is the equivalent of a $2\pi$ step but requires only the drive current swing of a normal data transition.

The $\pi$ (or $2\pi$) feedforward steps required need not be dc steps if there is a feedback loop (not shown) maintaining the long-term operating point of the laser. All that is required is a differentiated step (waveform a in FIG. 5) which decays much more slowly than the feedback control loop response time. This will avoid the need for a fast step circuit which has to step an ever increasing total amplitude of many steps (waveform B in FIG. 5).

I claim:

1. A method of operating an optical transmitter laser in an FSK data direct detection system wherein the laser is supplied with a drive current modulated in accordance with the logic values of a digital data sequence, the transmitter having a feedback control circuit arranged to adjust the laser drive current in response to changes in operating parameters of the transmitter, the method including the stages of:

sensing when the range of available feedback adjustment is about to be exceeded, represented by a selected system parameter reaching a preset threshold, and superimposing on the feedback controlled laser drive current an additional step of predetermined fixed amplitude of drive current to the laser to bring the operation of the transmitter back within the range of adjustment of the feedback control circuit when said selected system parameter reaches said preset threshold.

2. A method according to claim 1 wherein the superimposition of the additional step of predetermined fixed amplitude of drive current is synchronous with a clock transition in the modulating data.

3. A method according to claim 2 wherein the value of the superimposed fixed amplitude step is such as to cause the phase of the interferometer to shift by $2\pi$.

4. A method according to claim 2 wherein the value of the superimposed fixed amplitude step is such as to cause the phase of the interferometer to shift by $+\pi$ and is synchronised with a data transition effective to cause a phase shift of $-\pi$ in the interferometer.

5. An optical frequency shift keyed direct detection system, the system comprising:

a laser having a drive current modulated in accordance with the logic values of a digital data sequence;

an unbalanced two-path interferometer to which the laser output is applied, whereby a phase shift in the optical frequency occurs upon modulation of the laser, sensing means for sensing when a selected system parameter reaches a predetermined threshold;

a feedback control circuit arranged to adjust the modulated drive current in response to changes in the selected system parameter of the laser; and means responsive to the sensing means for superimposing on the feedback controlled laser drive current an additional step of predetermined fixed amplitude of drive current to the laser to bring the operation of the laser back within the range of adjustment of the feedback control circuit when said selected system parameter reaches said preset threshold.

6. A system according to claim 5 wherein said feedback loop is arranged to maintain the long-term operating point of the laser, said means for superimposing the fixed amplitude step of laser drive current being adapted to provide differentiated steps of current having a decay time substantially greater than the feedback loop response time.

* * * * *